(12) United States Patent
Stiesdal

(10) Patent No.: US 7,876,011 B2
(45) Date of Patent: Jan. 25, 2011

(54) METHOD FOR ENCAPSULATING PERMANENT MAGNETS OF A ROTOR OF A GENERATOR AND ROTOR OF A GENERATOR

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/431,987

(22) Filed: Apr. 29, 2009

(65) Prior Publication Data

US 2009/0267436 A1 Oct. 29, 2009

(30) Foreign Application Priority Data

Apr. 29, 2008 (EP) ................... 08008189

(51) Int. Cl.
*H02K 21/12* (2006.01)
*H01L 41/00* (2006.01)

(52) U.S. Cl. ............... 310/156.23; 310/156.01; 310/156.07; 310/156.28; 310/156.31; 310/340

(58) Field of Classification Search .......... 310/156.23, 310/156.28, 340, 156.01, 156.07, 156.31, 310/156.16
See application file for complete search history.

(56) References Cited

U.S. PATENT DOCUMENTS

| 4,954,736 | A | 9/1990 | Kawamoto et al. |
| 5,040,286 | A | 8/1991 | Stark |
| 5,175,461 | A | 12/1992 | Zigler et al. |
| 6,444,035 | B1 | 9/2002 | Nowak et al. |
| 6,847,145 | B2 * | 1/2005 | Van Dine et al. ....... 310/156.59 |

FOREIGN PATENT DOCUMENTS

| DE | 3622231 A1 | 1/1988 |
| EP | 1367700 A2 | 3/2003 |
| JP | 01270756 A * | 10/1989 |
| JP | 11146585 A * | 5/1999 |
| JP | 2005295686 A * | 10/2005 |

OTHER PUBLICATIONS

Machine Translation JP2005295686 (2005), JP11146585 (1999), Derwent Translation Purpuse and Constitution JP01270756 (1989).*

* cited by examiner

*Primary Examiner*—Quyen Leung
*Assistant Examiner*—Jose A Gonzalez Quinones

(57) ABSTRACT

A method is provided for encapsulating permanent magnets of a rotor of a generator. Magnets, which are shorter than a rotor yoke in an axial direction, are placed outside of the yoke leaving a short portion of the yoke free at both ends. Spacers of a non-magnetic material are placed between the magnets. End barriers are placed on the free portions of the yoke. A thin sheet of a non-magnetic material is folded around the magnets and the spacers, covering the entire length of the rotor, including the barriers. An air tight membrane is placed on the outside of the sheet and sealed to the ends of the yoke so that the membrane and the yoke together form an air tight enclosure. A vacuum is applied to the air tight enclosure between the membrane and the yoke. Resin is infused into the air tight enclosure and set.

6 Claims, 2 Drawing Sheets

FIG 2
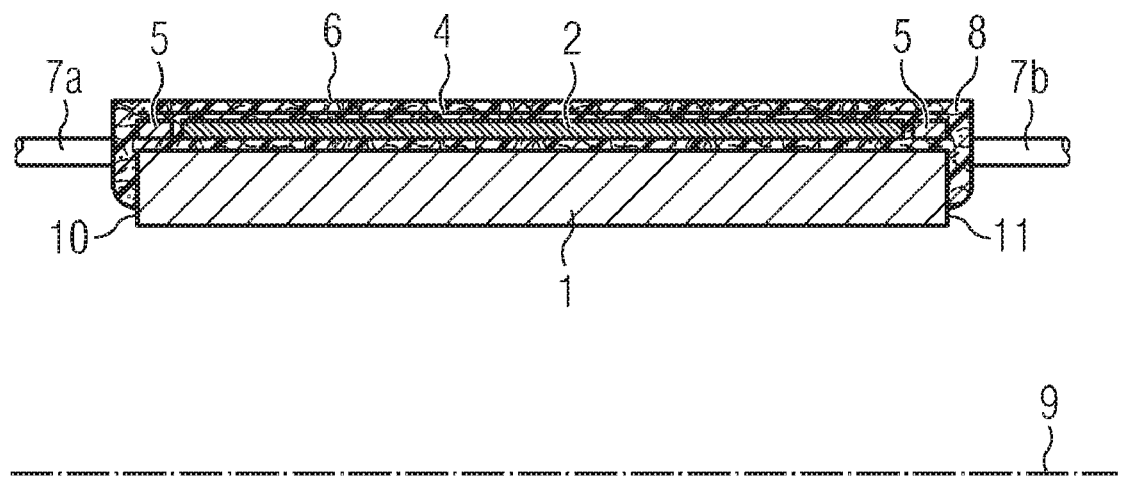
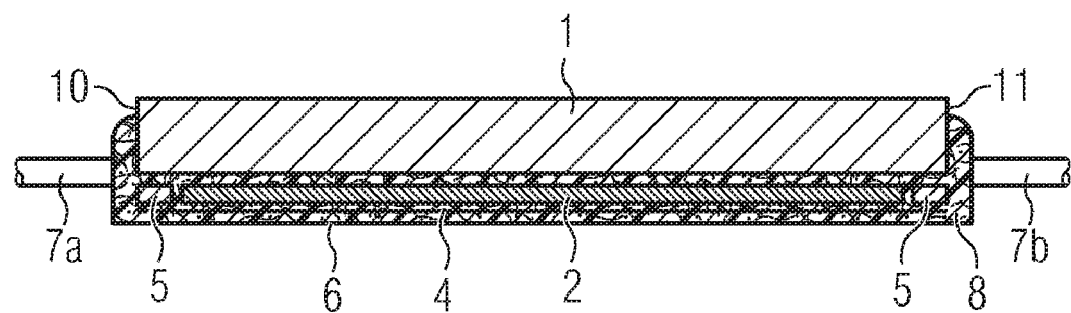

METHOD FOR ENCAPSULATING PERMANENT MAGNETS OF A ROTOR OF A GENERATOR AND ROTOR OF A GENERATOR

CROSS REFERENCE TO RELATED APPLICATIONS

This application claims priority of European Patent Office application No. 08008189.6 EP filed Apr. 29, 2008, which is incorporated by reference herein in its entirety.

FIELD OF INVENTION

The present invention relates to a method for encapsulating permanent magnets of a rotor of a generator. It further relates to a rotor of a generator and to a wind turbine.

BACKGROUND OF INVENTION

In a permanent magnet generator the magnets are typically bonded, for example glued, to the rotor core. Under normal operation conditions significant temperature increases in a generator are possible. Such temperature increases can weaken the bond between the rotor and the magnets. Unless measures are taken to keep the magnets in place, they might become detached from the rotor which could lead to serious damage to the generator.

In the document EP 1 367 700 A2 a method for manufacturing an encapsulated rotor of a permanent magnet motor is described. The method essentially uses Vacuum Assisted Resin Transfer Moulding. The described rotor is provided with rather complicated means for retaining the magnets besides the resin. The magnetic pole pieces are especially affixed to the rotor inner ring by pole retainers held by removable seal members such as screws.

In the U.S. Pat. No. 4,954,736 a method is described whereby the magnets are retained by a combination of mechanical retainers and thermosetting resin. A yoke attached to the rotor shaft is provided with a number of projections designed to hold the magnets. The projections and the magnets are dimensioned in such a way that there are small gaps between the projections and the magnets. These gaps are subsequently filled with resin in order to fix the magnets in the desired position.

The methods described in the U.S. Pat. Nos. 5,040,286 and 5,175,461 involve forcing the magnets against the rotor core by means of a cylindrical stainless steel shell, which is cold-pressed over the magnets, and filling any remaining cavities with an adhesive.

SUMMARY OF INVENTION

Therefore it is a first objective of the present invention to provide an advantageous method for encapsulating permanent magnets of a rotor of a generator. It is a second objective to provide an advantageous rotor of a generator. A third objective of the present invention is to provide an advantageous wind turbine.

The first objective is solved by a method for encapsulating permanent magnets of a rotor of a generator. The second objective is solved by a rotor of a generator. The third objective is solved by a wind turbine The depending claims define further developments of the invention.

The inventive method for encapsulating permanent magnets of a rotor of a generator with a rotor yoke comprising a rotor axis and two ends in axial direction comprises the steps of:

placing a number of permanent magnets, which are shorter than the rotor yoke in axial direction, on the outside of the rotor yoke leaving a short portion of the rotor yoke free at its both ends,
placing spacers of a non-magnetic material between the permanent magnets,
placing end barriers on the free portions of the rotor yoke,
folding a thin sheet of a non-magnetic material around the permanent magnets and the spacers, the sheet covering the entire length of the rotor, including the end barriers,
placing an air tight membrane on the outside of the sheet and sealing it to the ends of the rotor yoke so that the membrane and the rotor yoke together form an air tight enclosure,
applying vacuum to the air tight enclosure between the membrane and the rotor yoke,
infusing resin into the air tight enclosure, and
letting the resin set.

The inventive method generally uses Vacuum Assisted Resin Transfer Moulding. The used rotor may, for example, be a rotor of a wind power generator.

Advantageously, the permanent magnets may be fixed in their position by magnetic forces after placing them on the outside of the rotor yoke. This facilitates the assembly of the permanent magnets on the outside of the rotor yoke. Moreover, there is no need to use screws or the like. Compared to what is described in the cited state of the art, the inventive method provides a very simple method for manufacturing a rotor of a generator with encapsulated permanent magnets.

The thin sheet of non-magnetic material may, for example, be made of fibreglass or stainless steel.

The rotor yoke may have a cylindrical shape, especially a circular cross section. The rotor yoke may further comprise a circumference. The spacers of a non-magnetic material can be placed between the permanent magnets such that the permanent magnets are maintained at regular angular distances with respect to the circumference of the rotor yoke. For example, the spacers may be pressed into openings between the magnets. Moreover, the magnets and/or the spacers may be affixed by means of a fast curing adhesive.

Advantageously, a number of vacuum ports can be inserted into the air tight membrane before applying vacuum to the air tight enclosure. Especially, a number of vacuum ports may be inserted into the air tight membrane at regular intervals around the circumference of the rotor at both ends of the rotor yoke. This allows for uniformly applying vacuum to the air tight enclosure and for uniformly infusing resin into the air tight enclosure.

Generally, vacuum may be applied to the air tight enclosure between the membrane and the rotor yoke by means of vacuum ports. Furthermore, the resin can be infused into the air tight enclosure under vacuum. The resin may, for example, be infused into the air tight enclosure such that all cavities become filled with resin. Advantageously, a port which is located at the opposite end to a vacuum port is used for infusing resin. This facilitates the infusion of resin into the air tight enclosure under vacuum conditions.

The inventive method is very simple compared to what is described in the cited state of the art. No other means for retaining the magnets are necessary. The encapsulation generally serves a dual purpose. It protects the magnets from environmental influences, for example the humidity of the air, which could cause corrosions. Moreover, it helps retain the magnets in their position. Permanent magnets can be brittle, and the encapsulation prevents chips from becoming detached from the magnets. The encapsulation is manufactured using Vacuum Assisted Resin Transfer Moulding so that all cavities in the structure can be filled with resin, and so that all components of the rotor can become firmly bonded to each other.

The inventive rotor of a generator comprises a rotor yoke. The rotor yoke comprises a rotor axis and two ends in axial direction. The inventive rotor further comprises a number of permanent magnets which are shorter than the rotor yoke in axial direction and which are located on the outside of the rotor yoke leaving a short portion of the rotor yoke free at its both ends. Moreover, the rotor comprises a number of spacers of non-magnetic material which are located between the permanent magnets. The rotor further comprises at least two end barriers which are located on the free portions of the rotor yoke. A thin sheet of non-magnetic material is folded around the permanent magnets and the spacers covering the entire length of the rotor including the end barriers. Moreover, an air tight membrane is located on the outside of the sheet and is sealed to the ends of the rotor yoke so that the membrane and the rotor yoke together form an air tight enclosure. The air tight enclosure is filled with resin so that the rotor yoke, the magnets, the spacers, the sheet, and the end barriers are firmly bonded to each other.

The encapsulation of the magnets of the inventive rotor protects the magnets from environmental influences, for example the humidity of the air, which could cause corrosion. Moreover, the encapsulation helps retain the magnets in their position. Permanent magnets can be brittle, and the encapsulation prevents chips from becoming detached from the magnets.

The rotor yoke may have a cylindrical shape, especially a circular cross section. The spacers can be made of fibreglass or stainless steel. The generator may, for example, be a wind power generator.

The inventive wind turbine comprises an inventive rotor of a generator as previously described. The inventive wind turbine has the same advantages as the inventive rotor has.

BRIEF DESCRIPTION OF THE DRAWINGS

Further features, properties and advantages of the present invention will become clear from the following description of an embodiment in conjunction with the accompanying drawings. The described features are advantageous alone and in combination with each other.

FIG. 2 schematically shows the inventive rotor, which is shown in FIG. 1, in a sectional view along the rotation axis.

DETAILED DESCRIPTION OF INVENTION

Figure 1:
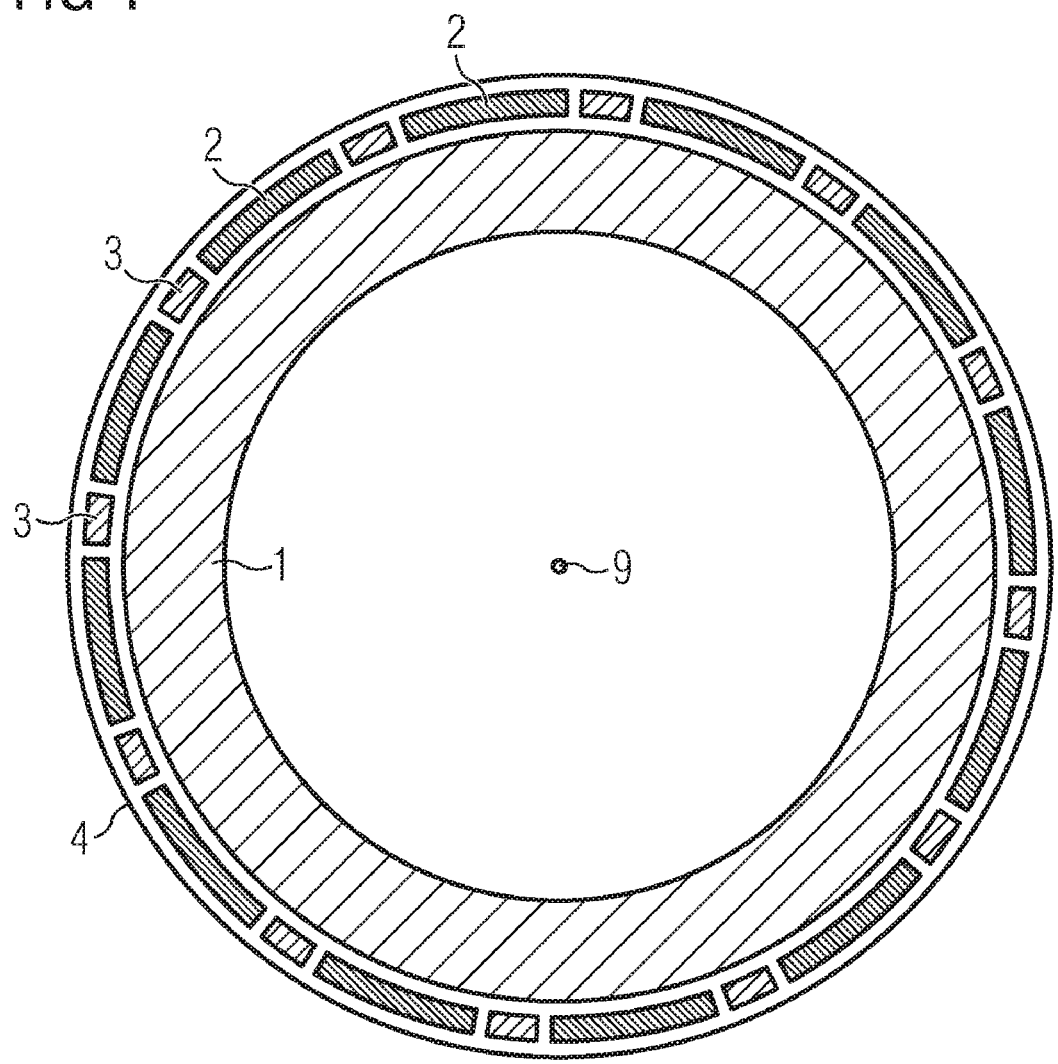
FIG. 1 schematically shows an inventive rotor of a generator in a sectional view perpendicular to the rotation axis.

An embodiment of the present invention will now be described with reference to FIGS. 1 and 2. FIG. 1 schematically shows an inventive rotor of a generator in a sectional view perpendicular to the rotation axis 9. The inventive rotor comprises a rotor yoke 1, permanent magnets 2, spacers 3, and a thin sheet of non-magnetic material 4. Some details, like the rotor shaft and spokes, have been omitted in FIG. 1 and FIG. 2.

The rotor yoke 1 has a cylindrical shape. The permanent magnets 2 are placed on the outside of the rotor yoke 1. The spacers 3, which are made of a non-magnetic material, are placed between the magnets 2 such that the magnets 2 are maintained at regular angular distances.

During the assembly the magnets 2 are fixed in their positions by the magnetic forces and the spacers 3 are pressed into the openings between the magnets 2. Alternatively, a fast curing adhesive can be used to affix the magnets 2 and/or the spacers 3. A thin sheet 4 of non-magnetic material, for example made of fibreglass or stainless steel, is folded around the magnets 2 and the spacers 3.

FIG. 2 schematically shows the inventive rotor in a sectional view along the rotation axis 9. The magnets 2 and the spacers 3, which are not shown in FIG. 2, are somewhat shorter than the rotor yoke 1, leaving a short portion of the yoke 1 free at both ends 10, 11 along the rotation axis 9. End barriers 5 of, for example, stainless steel or glass fibre material are placed on these free portions of the rotor yoke 1. These end barriers 5 have a dual function: they serve as inlet and outlet manifold during the resin infusion, and once the resin 8 has set, the end barriers 5 become part of the encapsulation of the magnets 2. The thin sheet of non-magnetic material, which is folded around the magnets 2 and the spacers 3, covers the entire length of the rotor, including the end barriers 5.

An air tight membrane 6 is placed on the outside of the sheet 4 and sealed to the ends 10, 11 of the rotor yoke 1 in axial direction so that the membrane 6 and the rotor yoke 1 together form an air tight enclosure. A number of vacuum ports 7a, 7b are inserted into the air tight membrane 6 at regular intervals around the circumference of the rotor at both ends 10, 11 of the rotor.

The vacuum ports 7a at one end 10 of the rotor are used to apply vacuum to the air tight enclosure between the membrane 6 and the rotor yoke 1. The ports 7b at the opposite end 11 are used as resin infusion ports. The resin 8 is infused into the air tight enclosure under vacuum so that all cavities become filled with resin 8. As the resin 8 sets the rotor yoke 1, the magnets 2, the spacers 3, the sheet 4, and the end barriers 5 become bonded to each other. As a result, the magnets 2 are completely encapsulated. This means, that the encapsulation is manufactured using Vacuum Assisted Resin Transfer Moulding so that all cavities in the structure are filled with resin 8, and so that all components of the rotor are firmly bonded to each other.

The encapsulation effectively protects the magnets 2 from environmental influences, for example the humidity of the air, which could cause corrosion. Furthermore, the encapsulation helps retain the magnets 2 in their position. This means that, compared with the cited state of the art, no screws or holding projections or outer shells are necessary. In the inventive rotor no other means for retaining the magnets are necessary. Therefore the inventive rotor is simple to manufacture compared to what is described in the cited state of the art.

The invention claimed is:

1. A rotor of a generator, comprising:
   a rotor yoke comprising a rotor axis and two ends in an axial direction;
   a plurality of permanent magnets which are shorter than the rotor yoke in the axial direction and which are located on an outside of the rotor yoke leaving a short portion of the rotor yoke free at the two ends;
   a plurality of spacers of a non-magnetic material located between the permanent magnets so that at least one of the plurality of spacers is located between adjacent permanent magnets;
   at least two end barriers which are located on the free portions of the rotor yoke so that at least one of the two end barriers is located at each free portion;
   a thin sheet of a non-magnetic material which is folded around the plurality of permanent magnets and the plurality of spacers covering the entire length of the rotor including the end barriers; and an air tight membrane which is located on an outside of the thin sheet and which is sealed to the ends of the rotor yoke so that the membrane and the rotor yoke together form an air tight enclosure which is filled with resin, wherein the resin is disposed between the rotor yoke and the plurality of magnets, between the plurality of magnets and the non-magnetic material, between the non-magnetic material and the air tight membrane, between the end barriers and the plurality of magnets, between the end barriers and the air tight membrane, and between each one of the plurality of spacers and an adjacent permanent magnet, so that the rotor yoke, the plurality of magnets, the plurality of spacers, the thin sheet and the end barriers are firmly bonded to each other.

2. The rotor of a generator as claimed in claim 1, wherein the plurality of spacers are made of fibreglass or stainless steel.

3. The rotor of a generator as claimed in claim 1, wherein the generator is a wind power generator.

4. A wind turbine, comprising:
a rotor yoke, comprising:
a rotor axis and two ends in an axial direction, a plurality of permanent magnets which are shorter than the rotor yoke in the axial direction and which are located on an outside of the rotor yoke leaving a short portion of the rotor yoke free at the two ends,
a plurality of spacers of a non-magnetic material located between the permanent magnets so that at least one of the plurality of spacers is located between adjacent permanent magnets,
at least two end barriers which are located on the free portions of the rotor yoke so that at least one of the two end barriers is located at each free portion,
a thin sheet of a non-magnetic material which is folded around the plurality of permanent magnets and the plurality of spacers covering the entire length of the rotor including the end barriers, and
an air tight membrane which is located on an outside of the thin sheet and which is sealed to the ends of the rotor yoke so that the membrane and the rotor yoke together form an air tight enclosure which is filled with resin, wherein the resin is disposed between the rotor yoke and the plurality of magnets, between the plurality of magnets and the non-magnetic material, between the non-magnetic material and the air tight membrane, between the end barriers and the plurality of magnets, between the end barriers and the air tight membrane, and between each one of the plurality of spacers and an adjacent permanent magnet, so that the rotor yoke, the plurality of magnets, the plurality of spacers, the thin sheet and the end barriers are firmly bonded to each other.

5. The wind turbine as claimed in claim 4, wherein the plurality of spacers are made of fibreglass or stainless steel.

6. The wind turbine as claimed in claim 4, comprising a wind power generator.

* * * * *